United States Patent [19]
Eaker

[11] Patent Number: 5,487,407
[45] Date of Patent: Jan. 30, 1996

[54] SOLENOID CONTROLLED ONE-WAY VALVE

[75] Inventor: Garlan L. Eaker, Louisville, Tenn.

[73] Assignee: Robertshaw Controls Company, Richmond, Va.

[21] Appl. No.: 348,540

[22] Filed: Dec. 1, 1994

[51] Int. Cl.$^6$ .............................. F16K 15/00; F16K 31/02
[52] U.S. Cl. ................... 137/522; 137/529; 251/129.21; 335/274
[58] Field of Search ...................... 251/129.15, 129.21, 251/129.01, 129.02; 335/274, 273; 137/529, 522

[56] References Cited

U.S. PATENT DOCUMENTS

| | | |
|---|---|---|
| 2,873,760 | 2/1959 | Safford . |
| 3,308,846 | 3/1967 | Yuile . |
| 4,245,667 | 1/1981 | Braukmann . |
| 4,485,843 | 12/1984 | Wolff . |
| 4,573,659 | 3/1986 | Homes ........................... 251/129.02 |
| 4,596,271 | 6/1986 | Brundage . |
| 4,631,923 | 12/1986 | Smith . |
| 4,783,009 | 11/1988 | Coates ........................... 251/129.21 X |
| 4,799,506 | 1/1989 | Taylor . |
| 4,932,434 | 6/1990 | Taylor . |
| 5,056,556 | 10/1991 | Nishimoto et al. . |
| 5,230,364 | 7/1993 | Leng et al. . |
| 5,318,066 | 6/1994 | Burgdorf et al. ................. 137/529 |
| 5,349,998 | 9/1994 | Gonfiantini .................... 137/522 X |

Primary Examiner—Martin P. Schwadron
Assistant Examiner—Kevin L. Lee
Attorney, Agent, or Firm—Watts, Hoffmann, Fisher & Heinke Co.

[57] ABSTRACT

A valve assembly having a first condition for blocking system fluid flow when system fluid pressure differential across the valve assembly is in a given range above a predetermined pressure differential and a second condition for permitting system fluid flow in one direction when system fluid pressure differential across the valve assembly is greater than the predetermined pressure. The valve comprises a valve housing, a valving member within the housing, a solenoid assembly, first and second springs for exerting force on the valving member and a solenoid energizing circuit. The valve housing defines a fluid flow inlet, a fluid flow outlet and supports a valve seat between the inlet and outlet. The valving member comprises a valving element positioned for engagement with the valve seat and a stem element fixed to and projecting from the valving element. The valving element is movable between an open position spaced from the valve seat for enabling fluid flow through the housing and a closed position engaged with the valve seat. The solenoid assembly comprises an armature movable with respect to the valving member and the housing. The solenoid assembly has an energized condition in which the armature is subjected to an electromagnetic force. The first and second springs coact to produce a net spring force maintaining the valving member in one of its positions when of system fluid pressure tending to shift the valving member toward the other position is in the range when the solenoid is de-energized. The solenoid is energized to shift the armature for substantially reducing the net spring force applied to the valving member thus enabling system fluid pressure forces above the predetermined force to shift the valving member toward the other position.

11 Claims, 4 Drawing Sheets

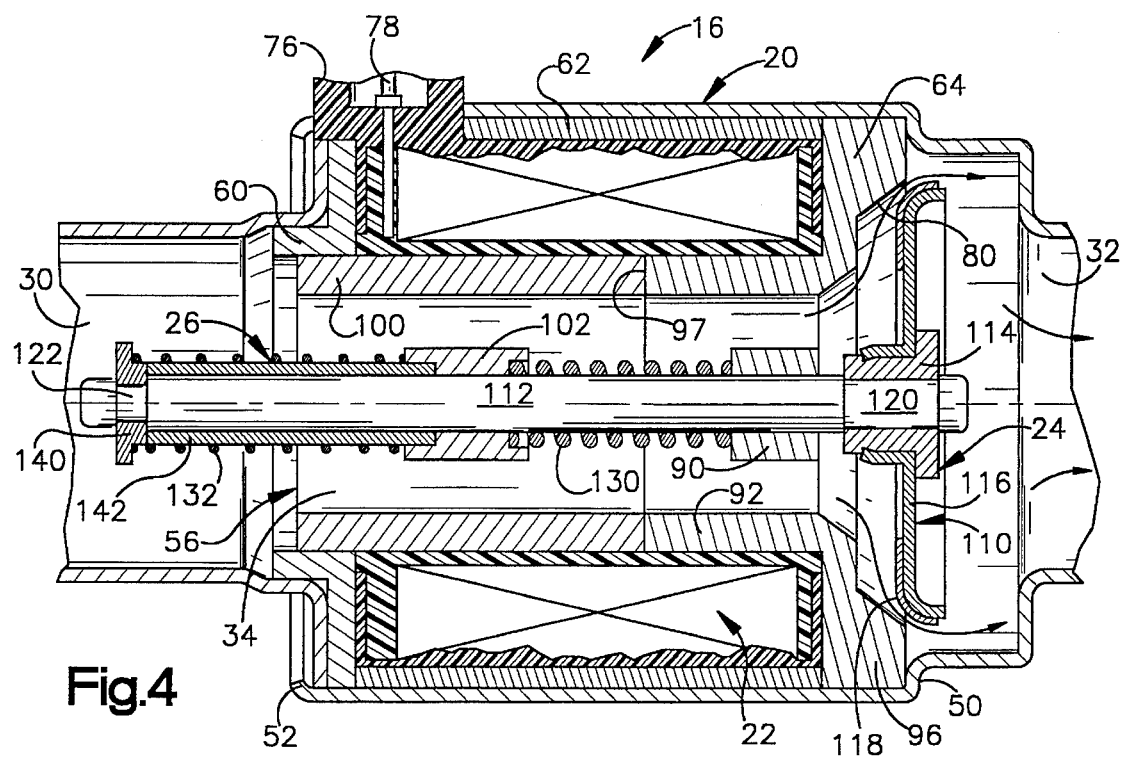
Fig.4
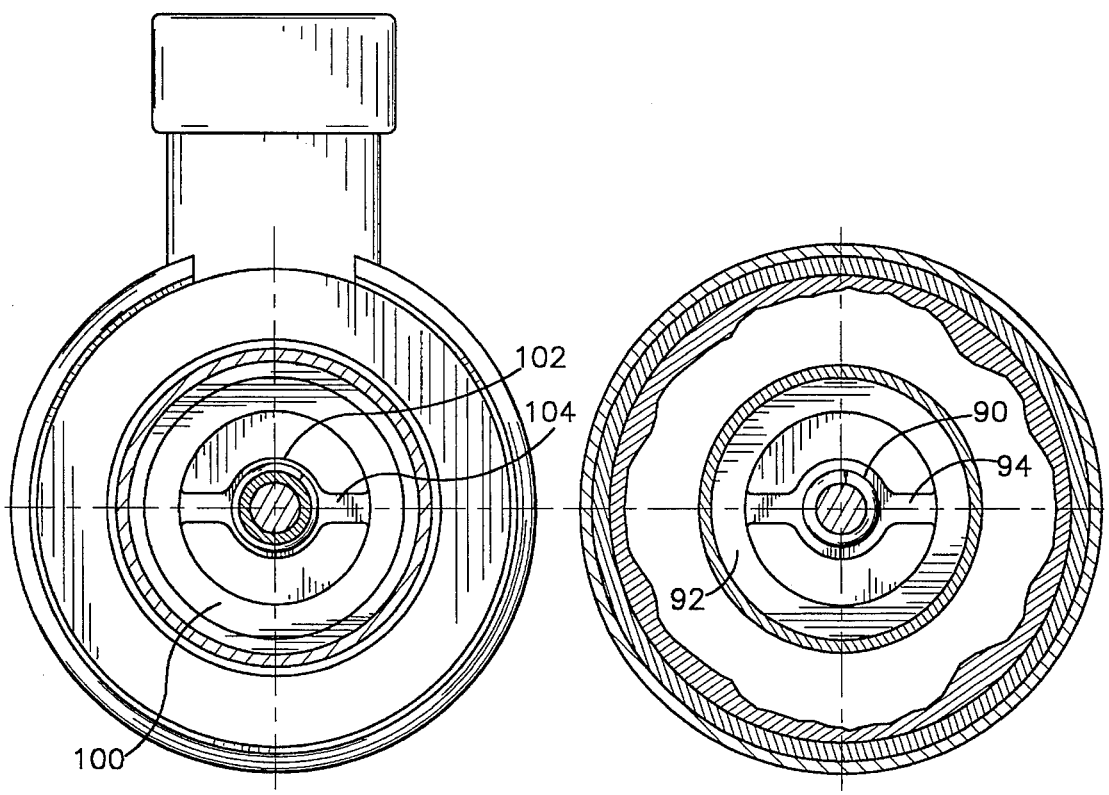
Fig.5                    Fig.6

SOLENOID CONTROLLED ONE-WAY VALVE

FIELD OF THE INVENTION

The present invention relates to valves which may be controlled to permit substantially one-way flow in one condition and to remain open or closed in an alternative condition.

BACKGROUND OF THE INVENTION

One-way valves for controlling flow in fluid systems are relatively common. Valves having one condition permitting flow in one direction within a system while, in a second condition, remaining opened or closed are less common.

For example, U.S. Pat. No. 3,308,846 discloses a pressure relief valve which is closed by the combined forces of an energized solenoid and a spring element. When a predetermined system pressure is sensed the solenoid is de-energized. The system pressure force overcomes the spring element force so the valve opens to vent the system to the atmosphere and relieve the pressure. Sensing a reduced system pressure re-energizes the solenoid, reclosing the valve.

U.S. Pat. No. 5,056,556 discloses a solenoid and single spring associated with a complex, multipart valving arrangement. The '556 patent valve is described as functioning as a relief valve as well as an on-off valve.

U.S. Pat. No. 4,631,923 discloses a valve arrangement in which a valving member is acted upon by a compression spring to close the valve and alternatively, when the solenoid is energized, by a tension spring to enable flow.

The prior art proposals did not provide compact, easily manufactured valve assemblies of relatively few, simple parts and did not provide for consistently precise and effective valve operation.

The present invention provides a new and improved fluid flow control valve having one condition for enabling one-way system fluid flow and a second condition in which the valve is open or closed to system flow and wherein the valve is of simple, compact construction, easily manufactured from relatively few parts.

SUMMARY OF THE INVENTION

A preferred embodiment of the invention provides a valve assembly having a first condition for blocking system fluid flow and a second condition for permitting system fluid flow in one direction when system fluid pressure differential across the valve assembly is greater than a predetermined pressure. The new valve comprises a valve housing, a valving member within the housing, a solenoid assembly, first and second springs for exerting force on the valving member and a solenoid energizing circuit. The valve housing defines a fluid flow inlet, a fluid flow outlet and supports a valve seat between the inlet and outlet. The valving member comprises a valving element positioned for engagement with the valve seat and a stem element fixed to and projecting from the valving element. The valving element is movable between an open position spaced from the valve seat for enabling fluid flow through the housing and a closed position engaged with the valve seat. The solenoid assembly comprises an armature movable with respect to the valving member and the housing. The solenoid assembly has an energized condition in which the armature is subjected to an electromagnetic force. The first and second springs coact to produce a net spring force maintaining the valving member in one of its positions in the presence of system fluid pressure forces in a given range above a predetermined system pressure force tending to shift the valving member toward the other position when the solenoid is de-energized. The solenoid is energized to shift the armature for substantially reducing the net spring force applied to the valving member thus enabling system fluid pressure forces in the range to shift the valving member toward the other position.

The preferred valve assembly is so constructed and arranged that a part of the solenoid assembly fixed with respect to the housing defines the valve seat as well as supporting and guiding the valving member. The fluid flow path through the housing assembly extends through the solenoid assembly.

In an illustrated embodiment of the invention the springs both urge the valving member toward the closed position. The solenoid armature engages at least one spring element and shifts when the solenoid is energized to reduce the valve closing spring force applied to the valving member. System fluid pressure forces above a predetermined force shift the valving member toward the open position to permit flow from the inlet to the outlet.

The illustrated valve assembly is associated with a fluid system wherein a first fluid is injected through the valve assembly into a second fluid under predetermined conditions. The illustrated valve assembly is normally closed to preclude both the first fluid injection and second fluid backflow through the valve assembly. When a predetermined condition is sensed the solenoid energizing circuit operates so that the net spring force applied to the valving member is reduced, thus permitting first fluid injection into the second fluid, under predetermined differential fluid pressure conditions, and precluding second fluid backflow through the valve assembly.

Further features and advantages of the invention will become apparent from the following description of a preferred embodiment made in reference to the accompanying drawings which form part of the specification.

BRIEF DESCRIPTION OF THE DRAWINGS

FIG. 4 is a fragmentary cross sectional view of a valve assembly similar to that of FIG. 2 with the valve assembly illustrated in still another alternative operating condition;

FIG. 5 is a cross sectional view of the valve assembly of FIG. 2 seen approximately from the plane indicated by the line 5—5 of FIG. 2;

FIG. 6 is a cross sectional view of the valve assembly of FIG. 2 seen approximately from the plane indicated by the line 6—6 of FIG. 2; and, FIG. 7 is cross sectional view of a modified valve assembly constructed according to the invention.

BEST MODE FOR PRACTICING THE INVENTION

Figure 1:
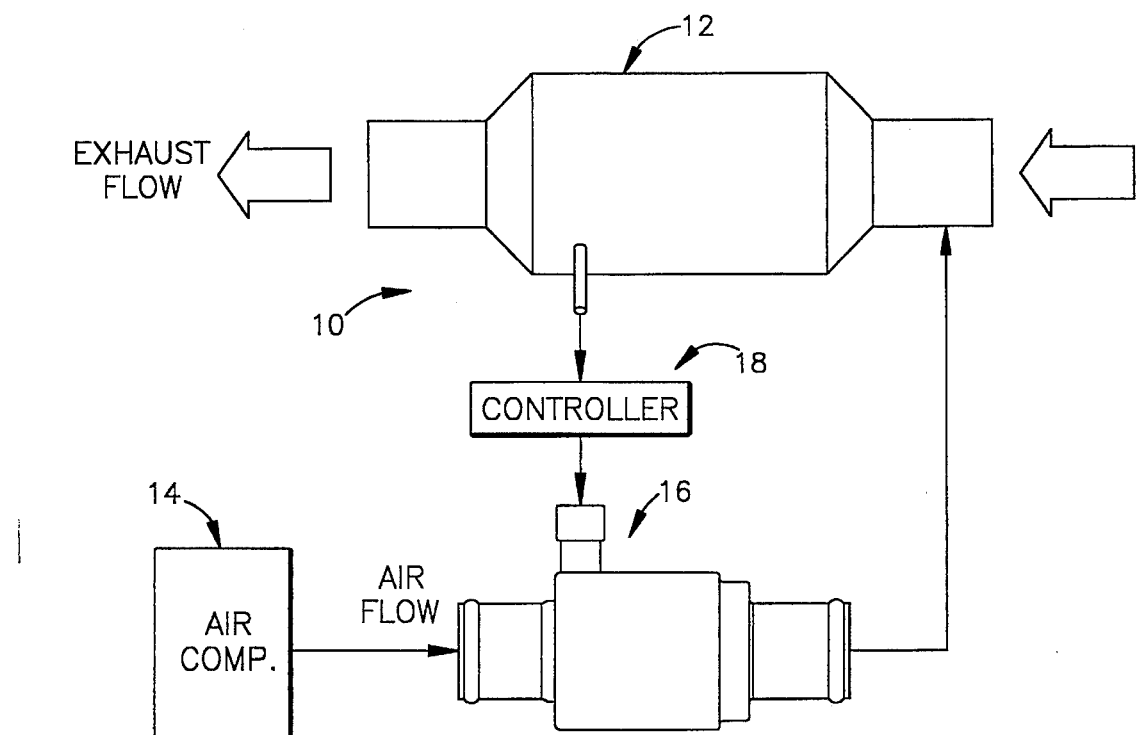
FIG. 1 is a partially diagrammatic illustration of a fluid system incorporating a valve assembly embodying the present invention.

FIG. 1 of the drawings illustrates a fluid system 10 in the form of an automotive vehicle exhaust system. The system 10 comprises a catalytic converter 12 for conditioning exhaust gas directed through it from a vehicle engine (not illustrated), an air compressor 14 operated from the engine for compressing atmospheric air, a valve assembly 16 for enabling compressed air flow to the catalytic converter in predetermined circumstances and a controller 18 governing operation of the valve assembly in response to a sensed condition. The illustrated valve assembly is connected between the compressor and the catalytic converter by conventional flexible air hoses.

The catalytic converter 12 may be of any conventional or suitable construction and is not illustrated or described in detail. Suffice it to say the converter is of a type which loses effectiveness when temperatures are outside a given range. Supplemental air is introduced to the converter 12 in these circumstances to reestablish converter effectiveness. The catalytic converter 12 typically operates at internal pressures which vary considerably above atmospheric pressure. Supplemental air flows to the converters must therefore be supplied from a source of compressed air.

The compressor 14 is a relatively small air compressor, which may be of any conventional or suitable construction, and provides the source of supplemental catalytic converter air. When the exhaust gas pressure in the catalytic converter exceeds the compressor outlet pressure, exhaust gas backflows into the compressor 18 must be blocked to prevent damaging the compressor. The valve assembly 16 precludes the engine exhaust from entering the air compressor.

The controller 18 provides an electrical output signal which operates the valve assembly. The controller 18, for purposes of this description, is a temperature responsive electrical circuit which produces the valve operating electrical output signal. The controller 18 may be of any suitable or conventional design and therefore is not illustrated in detail. The output signal for operating the valve assembly can be provided directly from controller circuitry, e.g. from an output transistor, or the like, or via contacts of a switch operated by the controller.

Figure 3:
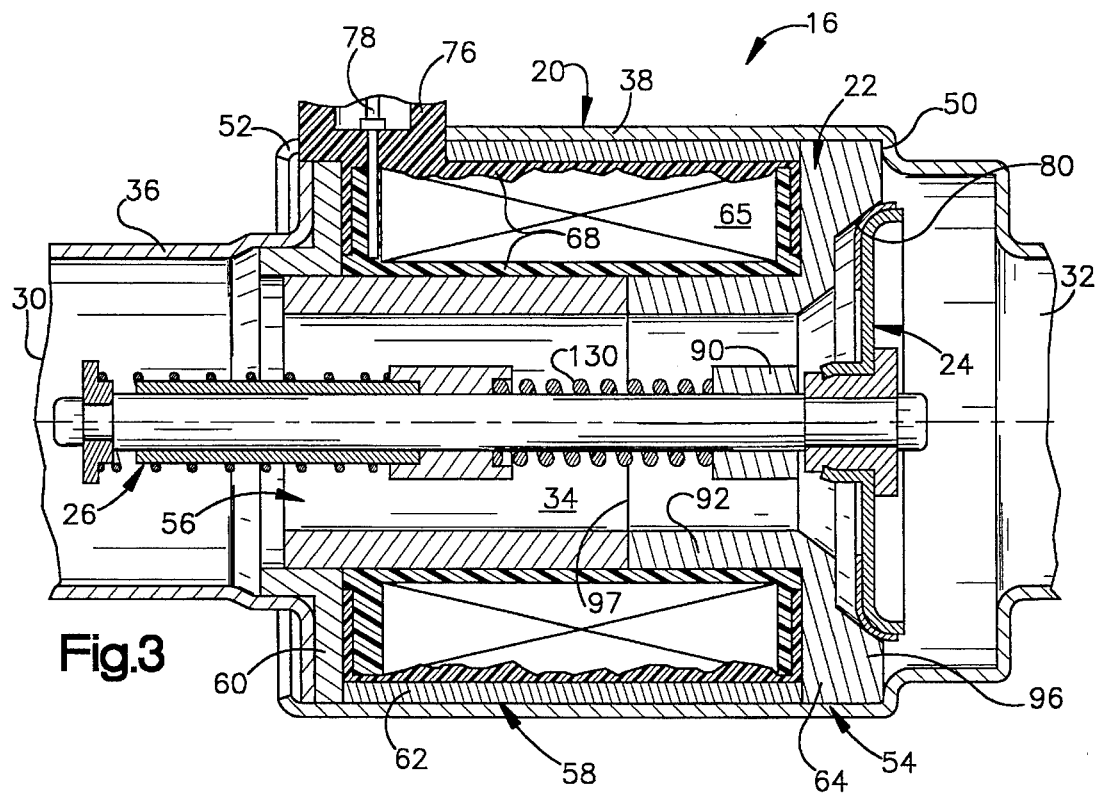
FIG. 3 is a fragmentary cross sectional view of a valve assembly similar to that of FIG. 2 with the valve assembly illustrated in an alternative operating condition.
Figure 2:
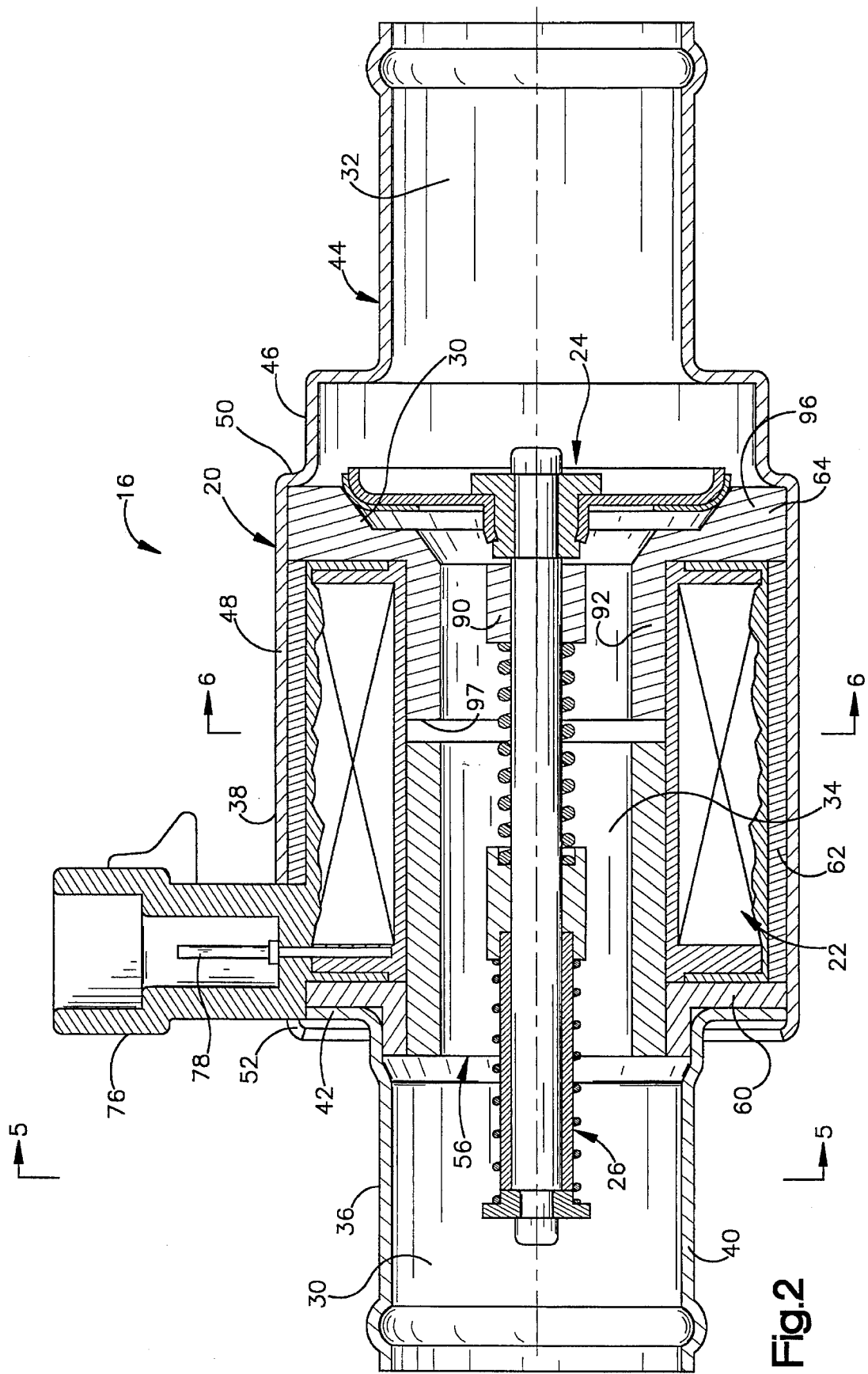
FIG. 2 is cross sectional view of a valve assembly constructed according to the invention.

When the illustrated valve assembly 16 is de-energized it blocks flow in either direction through it. When the controller 18 detects temperatures beyond a predetermined range and energizes the valve assembly 16, it is then conditioned to operate as a check valve. As such it enables supplemental air flow from the compressor to the converter so long as the compressor output pressure remains greater than the converter pressure. Should the converter pressure increase above the compressor output pressure the valve 16 closes to block any backflow. Referring to FIGS. 2–4, the valve assembly 16 comprises a valve housing 20, a solenoid assembly 22, a valving member 24 within the housing, and a spring system, generally designated by the reference character 26, coacting with the solenoid for exerting force on the valving member.

The valve housing 20 defines a fluid flow inlet 30, a fluid flow outlet 32 and a flow passage, or path, 34 extending through the housing 20 between the inlet and outlet. In the preferred embodiment the valve housing 20 is formed by first and second tubular body members 36, 38 which are hermetically clinched together. The body member 36 defines a seamless cylindrical hose nipple 40 terminating in a radial flange 42 abutting the solenoid assembly 22. The body member 38 is a seamless stepped cylinder defining a hose nipple 44, an enlarged valve chamber section 46 and a cylindrical solenoid support section 48. The section 48 tightly clamps the solenoid assembly against the flange 42 between a shoulder 50 and an opposed lip 52 crimped into engagement with the flange 42. The housing 20 tightly engages the solenoid assembly so that there is minimal air leakage from the housing.

The solenoid assembly 22 is electrically energized from the controller 18 for changing the operational state of the valve assembly. The solenoid assembly 22 comprises a stator assembly 54 and an armature 56 actuated by the stator assembly. The stator assembly is fixed in the housing 20 and electrically coupled to the controller 18 via output signal leads. The armature 56 is disposed within the stator on the flow path 34.

The stator assembly comprises a generally cylindrical, unitary coil assembly 58 and pole pieces 60, 62, and 64 associated with the coil and the armature. The fluid flow path 34 extends through central openings in the stator assembly. Air flowing along the path 34 is in convective heat transfer relationship with the stator assembly and cools the stator assembly to reduce electrical resistance heating.

The coil assembly 58 comprises an insulated wire coil 65 wound into a cylindrical shape on a spool 66 and a plastic insulating body 68 encapsulating the coil and spool so that the assemblage forms a unitary cylindrical body. The insulator body 68 forms a receptacle 76 projecting radially from coil assembly and through a slot in the solenoid support section 48 of the housing 20. The receptacle surrounds terminal posts 78 (only one of which is illustrated) respectively attached to opposite ends of the coil wire 65. The controller leads plug into the receptacle 76 and in so doing establish contact with the terminal posts.

The pole pieces 60, 62 and 64 are magnetically coupled to each other, the coil 65 and to the armature 56 to form a magnetic circuit capable of producing armature operating magnetomotive force. The pole piece 60 is clamped against the coil assembly and pole piece 62 by the housing flange 42. The illustrated pole piece 60 is an annular member having a radial flange-like body engaging the pole piece 62 at its outer periphery and an inner, cylindrical collar extending closely about the armature. The collar and armature are closely spaced so that the armature can move freely relative to the pole piece 60 along the axis of the collar yet a minimal clearance air gap exists between them. Accordingly the armature 56 and the pole piece 60 are magnetically coupled relatively efficiently.

The pole piece 62 is a cylindrical member extending about the coil assembly 58 between the pole pieces 60, 64. The pole piece 62 is clamped between the pieces 60, 64 so that the flux path through these pole pieces is uninterrupted by an air gap.

The pole piece 64 is constructed and arranged to form part of the flow path 34, support and guide the valving member 24 and form a valve seat 80 for the valving member. The pole piece 64 comprises a central hub 90, a cylindrical collar 92 extending about the hub 90, struts 94 (FIG. 6) connecting the hub and collar, and an annular body 96 extending radially outwardly from an end of the collar beyond the coil 65 into engagement with the pole piece 62. The illustrated pole piece 64 is formed from powdered magnetic metal which is molded to form a single continuous member.

The collar 92 is disposed in the coil assembly central opening with its outer cylindrical surface snugly surrounded by the insulator body 68, its cylindrical inner surface forming part of the flow path 34 and its inner end wall 97 confronting the armature and forming an armature travel limiting stop.

The illustrated hub 90 supports the valving member 24 for reciprocating movement in the direction of the flow path axis. The hub 90 is a cylindrical member disposed coaxially with the collar 92 and defining a smooth valve member supporting bore. The struts 94 rigidly support the hub 90 within the collar 92. In the illustrated embodiment of the invention two diametrically opposed struts 94 (see FIG. 6) extend through the flow path 34 between the hub and the collar.

The armature 56 is slidably disposed within the insulator body 68 and the pole piece 60 for reciprocating motion when the coil is energized and deenergized. The armature 56 comprises a tubular cylindrical body 100, a hub 102 disposed on the central axis of the body 100 and struts 104 (FIG. 5) fixing the hub relative to the body 100. The illustrated armature 54 is formed from a molded body of magnetic powdered metal. A cylindrical bushing (not illustrated) may be fixed in the insulator body 68 for guiding the armature. The guide bushing is preferably constructed from a thin sheet of phosphor bronze or the like.

The struts 104 are preferably diametrically opposed and extend through the flow path 34 between the hub 102 and the body 100. The struts support the hub 102 in the armature and the hub 102 in turn supports the valving member 24 for movement relative to the armature. The hub 102 defines a central smooth bore for receiving the valving member. The body 100 is disposed within the pole piece 60 whether the coil 65 is energized or not so that the pole piece 60 and the armature are always positioned with respect to each other for efficient magnetic coupling.

The valving member 24 comprises a valving element 110 positioned for engagement with the valve seat 80 and a stem element 112 fixed to and projecting from the valving element. The valving element 110 is movable between an open position spaced from the valve seat 80 for enabling fluid flow through the valve housing via the flow passage 34 and a closed position engaged with the valve seat 80.

The valving element 110 is a poppet comprising a spool-like central body 114, a thin, radially extending sheet metal skirt 116 clinched to the body 114, and an annular sealing ring 118 fixed to the skirt for engaging the valve seat. The skirt has a central tubular section pressed between opposite spool flanges on the body 114. The skirt 116 projects radially to its outer periphery which is radiused and curves away from the valve seat 80 in the down stream direction. The annular sealing ring 118 is preferably a resilient rubber-like member bonded to the skirt for sealing engagement with the valve seat.

The valve stem element 112 is a cylindrical pin having opposite, reduced diameter ends 120, 122 and a central section slidably received in the hubs 90, 102. The central cylindrical stem section is coaxial with and slidably received in the aligned bores of the hubs 90, 102. The reduced diameter end 120 supports the valving element body 114. The projecting tip of the end 120 is upset, or peened over, to clamp the poppet 110 securely in place on the stem.

The spring system 26 coacts with the valving member 24, the stator assembly 54 and the armature 56 to maintain the valve assembly 16 closed when the solenoid is de-energized as well as to enable one-way flow through the passage 34 when the solenoid is energized. The spring system 26 comprises a first spring 130 for opposing armature movement by the stator assembly, a second spring 132 reacting between the valve assembly and the armature for biasing the valving member toward its closed condition and force transmitting elements associated with the springs and the valving member 24. When the solenoid is de-energized both springs urge the valving member closed with sufficient combined force that the valving member blocks all flow through the passage. Solenoid energization cancels the valving member closing force provided by the spring 130 so that only the spring 132 biases the valving member closed. The biasing force is light so that when a relatively small pressure differential exists across the valving member poppet, one-way flow can occur.

The spring 130 is illustrated as a helical compression spring surrounding the valve stem element and compressed between the pole hub 90 and the armature hub 102. The force transmitting elements comprise a collar 140 fixed to the valve stem end 122 and a sleeve 142 surrounding the valve stem between the armature hub and the collar 140. When the solenoid assembly 22 is de-energized the force of the spring 130 acts directly on the valve assembly via the sleeve 142 which is engaged between the hub 102 and the collar 140.

The spring 132, which surrounds the sleeve 142, is a relatively light helical compression spring which also acts directly on the valve assembly via the collar 140. The combined spring forces maintain the valve assembly closed against all expected pressure differentials tending to open the valve.

When the solenoid assembly is energized the armature 56 is shifted toward the stator assembly 54 against the force of the spring 130. The magnetic force exceeds the spring force and the spring is compressed until the armature engages the pole piece wall 97. At that juncture, zero spring force is transmitted to the valving member through the sleeve 142. Consequently, the only closing force applied to the valving member is that provided by the spring 132. The spring 132 urges the valving member into engagement with the valve seat 80 with the collar 140 spaced away from the sleeve 142 (see FIG. 3).

When the differential pressure force acting on the valve poppet exceeds the bias force exerted by the spring 132, the valve assembly opens to enable air flow through the passage 34 (see FIG. 4). The limit of valve opening travel, and compression of the spring 132, is defined by engagement of the sleeve 142 with the collar 140 (FIG. 4). Whenever the pressure downstream from the valving member increases to a level approaching the upstream pressure, the valving member recloses. This avoids backflow to the compressor.

The typical operating condition of the valve assembly is with the solenoid energized and the valving member disengaged from the valve seat so that air flows through the valve housing. The air flow cools the solenoid coil.

Figure 7:
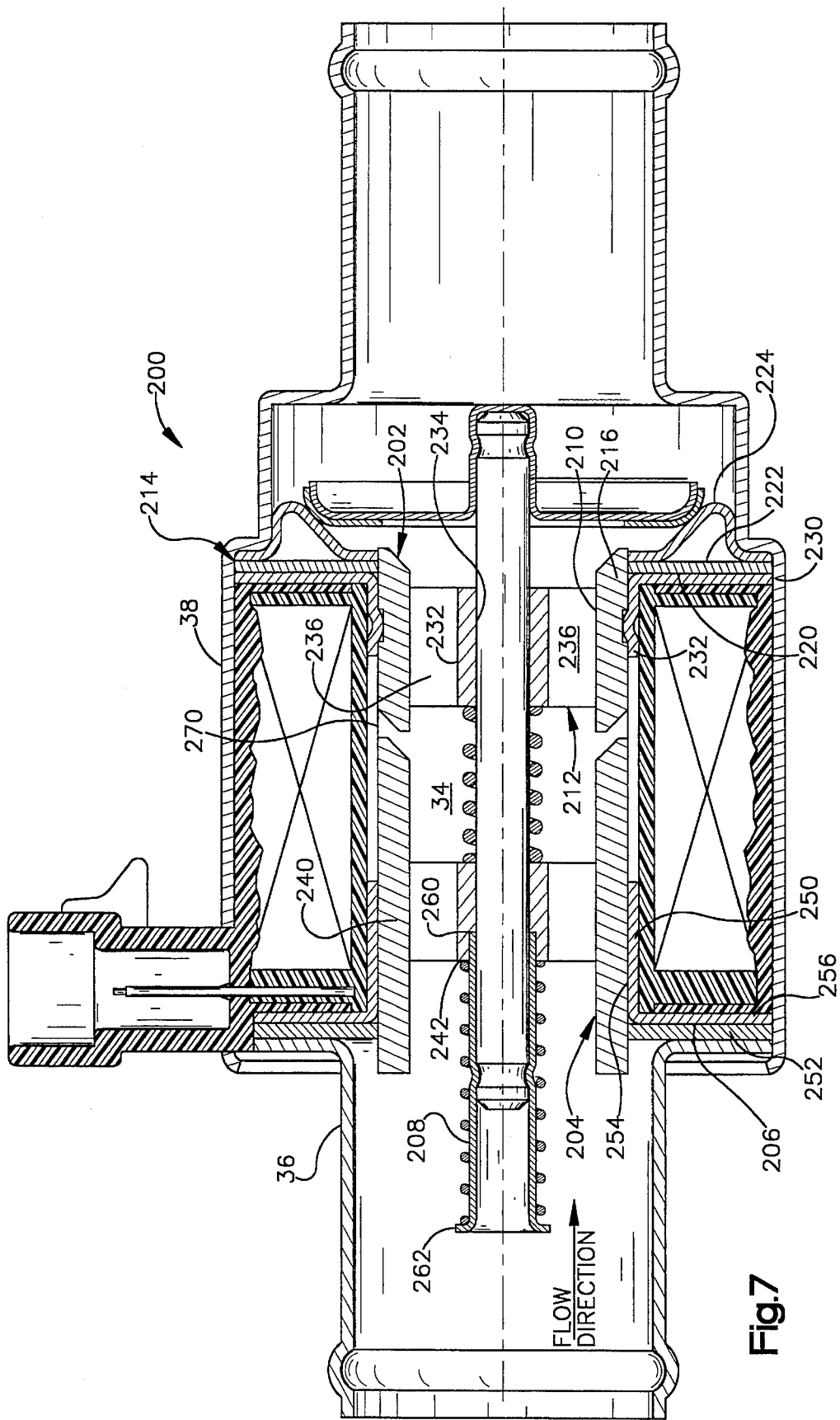

FIG. 7 illustrates a modified valve assembly 200 which is similar to the valve assembly 16. The valve assembly 200 functions like the valve assembly 16 but is constructed differently in that the pole piece 64 is replaced by a multipart pole assembly 202, the armature 56 is replaced by an armature assembly 204, the pole piece 60 is replaced by a pole assembly 206, and the force transmitting elements 134 are replaced by a single element 208. In addition, the body members 36, 38 are formed from a magnetic material (preferably 430 stainless steel) and function as magnetic conductors so the pole piece 62 is eliminated.

The pole assembly 202 comprises a stator collar 210, a hub 212, and a pole section 214 magnetically coupled to the collar and to the body member 38. The collar 210 and the pole section 214 are formed from magnetic material, such as 430 stainless steel.

The stator collar 210 is fixed in the coil assembly and aligned with the armature assembly. When the solenoid is energized the armature assembly is magnetically attracted to the stator collar and moves to engage the collar. The collar 210 is an elongated cylindrical member extending within the coil assembly to form part of the flow passage 34. A collar end section 216 projects from the end of the coil assembly for engagement and magnetic coupling with the pole section 214.

The pole section 214 is so constructed and arranged that it not only secures and supports the collar 210 in position with respect to the coil and armature assemblies but also forms the valve seat and provides efficient magnetic coupling with the collar. The pole section 214 comprises a collar support 220, a washer 222 and a valve seat 224. The collar support 220, washer 222 and valve seat 224 are clamped tightly together and against the coil by the housing body member 38. This assures that the collar is rigidly secured in place and that the pole elements are and remain magnetically coupled together.

The collar support 220 is formed by a flat annulus 230, extending radially from the housing body member 38 to the collar, and a cylindrical body 232 continuous with the annulus 230 and projecting into the coil assembly in surface contact with the collar periphery. The illustrated body 232 defines a circumferential, inwardly deformed wall segment extending into an aligned, conforming circumferential groove in the collar periphery to firmly lock the collar and body together.

The washer 222 and valve seat 224 are formed by annular elements having their outer peripheries engaged with the housing body member 38 and their inner peripheries engaging the collar 210. The washer 222 is a flat annulus while the valve seat member 224 is drawn to produce a circumferential generally frustoconical seat section engaged by the valving member. The valving member is formed from a nonmagnetic sheet metal (e.g. 304 stainless steel) so there is no magnetic attraction between the valving member and the seat when the solenoid is energized.

The hub 212 is formed by a central body 232 defining a smooth bore 234 receiving and guiding movement of the valve stem and equally spaced struts 236 projecting from the central body 232 into tight engagement with the collar 210. The collar 210 is preferably secured to the hub by a "press" or "interference" fit formed by forcing the collar onto the struts in a suitable press.

The armature assembly 204 comprises a tubular cylindrical magnetic armature member 240 slidably disposed in the passage 34 and a hub 242 pressed into the member 240 for guiding valve stem motion relative to both the armature and the stator. The magnetic armature member 240 is aligned with the collar 210. When the coil is energized the armature member moves into engagement with the collar. The adjacent ends of the armature member and the collar define conforming conical faces which fully engage to maximize the surface contact between the members. This in turn maximizes the magnetic attractive force between the armature member and the collar 210.

The pole assembly 206 comprises a flanged sleeve body 250 and an annular pressure plate 252 for conducting flux between the housing body member 38 and the armature member 240. The body 250 has a cylindrical section 254 surrounding and extending along the armature member 240 and a radial flange 256 extending outwardly into engagement with the housing body member 38. The plate 252 is a washer-like magnetic member engaged with the housing body member 38 at its outer periphery and clamped into firm engagement with the body 250 by the housing body member 36.

The force transmitting element 208 is a thin sheet metal tube fixed to the valve stem and transmitting the force of the spring 132 to the valve stem for biasing the valve closed. The tube 208 tightly surrounds the stem and has one end 260 telescoped into a countersunk section of the bore in the armature hub 242 and its opposite end 262 flared to retain the end of the spring 132. When the solenoid is energized the armature collar shifts to engage the stator collar 210. This eliminates the force applied to the valve stem by the spring 130 and reduces the closing force applied to the valve stem by the spring 132 as the armature hub moves away from the tube element 207. The relative dimensions of the tube 207 and the armature hub countersunk bore are determined so that the degree of valve opening while the solenoid is energized is limited to a predetermined maximum amount.

The valve assembly 200 is illustrated as incorporating a guide bushing 270 surrounding the armature collar for guiding its motion relative to the stator assembly. The guide bushing 270 extends between and is supported by the pole assemblies and is preferably constructed from a thin sheet of nonmagnetic material, such as phosphor bronze, which minimizes losses in the magnetic circuit through the pole assemblies and the armature collar.

While two preferred embodiments of the invention have been illustrated and described in detail, the present invention is not to be considered limited to the precise constructions disclosed. Various adaptations, modifications and uses of the invention may occur to those skilled in the art to which the invention relates and the intention is to cover hereby all such adaptations, modifications and uses which fall within the spirit or scope of the appended claims.

Having described my invention I claim:

1. A valve assembly for affecting fluid flow in a system comprising:

a valve housing defining flow openings at opposite ends thereof and a valve seat structure;

a valving member comprising a valving element positioned for engagement with said valve seat and a stem element fixed to and projecting from said valving element, said valving element movable between an open position spaced from said valve seat for enabling fluid flow through said housing and a closed position engaged with said valve seat;

a solenoid assembly comprising an armature movable with respect to said valving member and said valve housing, said solenoid having an energized condition wherein said armature is subjected to an electromagnetic force and a deenergized condition;

first and second spring elements reacting against said valving member, at least one spring element engagable with said armature;

said first and second spring elements coacting to produce a net spring force maintaining said valving member in one of said positions in the presence of system fluid pressure forces in a given range above a predetermined system net pressure force tending to shift the valving member toward the other position when said solenoid assembly is de-energized;

said solenoid assembly energized to shift said armature for substantially reducing the net spring force applied to said valving member for enabling system fluid pressure forces in said range to shift said valving member toward said other position.

2. The valve assembly claimed in claim 1 wherein said solenoid assembly further comprises a coil and a pole piece coupled to said coil, said coil and pole piece surrounding a flow passage through said valve housing with said pole piece forming said valve seat.

3. The valve assembly claimed in claim 1 wherein said valving member is maintained in said closed position by said springs when said solenoid is deenergized.

4. The valve assembly claimed in claim 1 wherein one of said spring elements has a substantially greater spring constant than the other, said one spring element acted upon by said armature so that when said solenoid is energized only said other spring element acts on said valving member.

5. The valve assembly claimed in claim 4 wherein said spring elements are separate compression springs, one reacting against said armature and the other reacting against the armature and the valving member.

6. The valve assembly claimed in claim 1 further including condition responsive signal producing elements for energizing said solenoid in response to a detected condition.

7. The valve assembly claimed in claim 2 wherein said pole piece further comprises structure for supporting said valving member for movement relative to said valve seat.

8. The valve assembly claimed in claim 1 further comprising an air pump communicating with one housing end opening and a catalytic converter communicating with said other end opening, said valving member biased in a direction to block flow from said converter to said pump.

9. A fluid flow controlling valve assembly comprising:

a. a valve housing defining a fluid flow inlet, a fluid flow outlet, a valve seat and a flow path extending between said inlet and outlet;

b. a solenoid assembly disposed in said housing between said inlet and said outlet comprising a coil surrounding said flow path in convective heat transfer relationship with air in said flow path, an armature disposed within said coil, and pole structure associated with said coil and said armature, said pole structure comprising pole elements spaced apart along said flow path, each pole element positioned with respect to said coil for magnetically coupling said coil with said armature;

c. a valve member comprising an actuating stem disposed along said flow path and a valving member attached to said stem and defining a circumferential seating face disposed radially outwardly from said stem;

d. said valve member supported for reciprocating motion to engage and disengage said valving member and said seat; and, e. a spring system for exerting a first force on said valve member when said solenoid in de-energized and exerting a second force on said valve member when said solenoid is energized.

10. The valve assembly claimed in claim 9 wherein said pole structure defines said valve seat and valve guide structure engaging and slidably supporting said actuating stem for reciprocating movement to engage and disengage said seating face and said valve seat.

11. A valve assembly for controlling flow in a fluid system and having a first condition for blocking system fluid flow when system fluid pressure differential across the valve assembly is in a given range above a predetermined pressure differential and a second condition for permitting system fluid flow in one direction when system fluid pressure differential across the valve assembly is in said range comprising:

a valve housing comprising a body defining a fluid flow inlet, a fluid flow outlet and a valve seat between said inlet and outlet;

a valving member disposed within said housing comprising a valving element positioned for engagement with said valve seat and a stem element fixed to and projecting from said valving element, said valving element movable between an open position spaced from said valve seat for enabling fluid flow through said housing and a closed position engaged with said valve seat;

a solenoid comprising an armature movable with respect to said valving member and said housing, said solenoid having an energized condition subjecting said armature to an electromagnetic force and a de-energized condition;

first and second springs coacting between said housing and said stem element to produce a valve closing spring force maintaining said valving member in said closed position to block fluid flow in either direction through the valve assembly when said solenoid is de-energized and said the system differential pressure acting on said valving member is in said range; and, a solenoid energizing circuit for energizing said solenoid to shift said armature relative to said spring elements, said armature engaging at least one spring element and shifting to reduce the valve closing spring force applied to said valving member so that system fluid differential pressures above said predetermined differential pressure shift said valving member toward said open position to permit flow from said inlet to said outlet.

* * * * *